US012764119B2

(12) United States Patent
Herberth et al.

(10) Patent No.: US 12,764,119 B2
(45) Date of Patent: Oct. 13, 2026

(54) COMPUTER-IMPLEMENTED IDENTITY AND ACCESS MANAGEMENT SYSTEM, METHOD, COMPUTER PROGRAM AND RECORDING MEDIUM

(71) Applicant: Siemens Aktiengesellschaft, Munich (DE)

(72) Inventors: Harald Herberth, Erlangen (DE); Alexander Adam, Weiden (DE); Sebastian Friedrich, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 19/163,009

(22) PCT Filed: Feb. 28, 2024

(86) PCT No.: PCT/EP2024/055080
§ 371 (c)(1),
(2) Date: Sep. 8, 2025

(87) PCT Pub. No.: WO2024/184150
PCT Pub. Date: Sep. 12, 2024

(65) Prior Publication Data

US 2026/0122071 A1 Apr. 30, 2026

(30) Foreign Application Priority Data

Mar. 9, 2023 (EP) .................................... 23160996

(51) Int. Cl.
*H04L 9/40* (2022.01)

(52) U.S. Cl.
CPC .......... *H04L 63/102* (2013.01); *H04L 63/105* (2013.01); *H04L 63/20* (2013.01)

(58) Field of Classification Search
CPC ...... H04L 63/102; H04L 63/105; H04L 63/20
(Continued)

(56) References Cited

U.S. PATENT DOCUMENTS 10,164,953 B2 * 12/2018 Golla .................. H04W 12/086
11,263,006 B2 * 3/2022 Lochhead ........... H04L 41/0893
(Continued)

FOREIGN PATENT DOCUMENTS

CN 101192135 6/2008
WO 2011047276 4/2011
(Continued)

OTHER PUBLICATIONS

PCT International Search Report dated Jun. 11, 2024 based on PCT/EP2024/055080 filed Feb. 28, 2024.

*Primary Examiner* — Samson B Lemma
(74) *Attorney, Agent, or Firm* — Cozen O'Connor

(57) ABSTRACT

A computer-implemented identity and access management system that includes at least two domains that are each assigned to a user organization, wherein a first domain is an original equipment manufacturer (OEM) domain assigned to users of an OEM organization, and a second domain is an end customer domain assigned to users of an end customer organization, where each domain includes a function memory module and a memory module for data corresponding to the functions, and where the function memory module and the data memory module of the OEM domain are configured such that they grant access only to a user of the OEM organization.

15 Claims, 1 Drawing Sheet

(58) Field of Classification Search
USPC .......................................................... 713/170
See application file for complete search history.

(56) References Cited

U.S. PATENT DOCUMENTS

| | | | | |
|---|---|---|---|---|
| 2008/0130042 | A1 | 6/2008 | Lizuka et al. | |
| 2010/0125895 | A1 | 5/2010 | Shull et al. | |
| 2013/0254882 | A1 * | 9/2013 | Kannappan | G06Q 30/06 726/22 |
| 2014/0075565 | A1 * | 3/2014 | Srinivasan | H04L 63/08 726/26 |
| 2016/0196432 | A1 * | 7/2016 | Main | H04W 12/08 726/1 |
| 2016/0301680 | A1 * | 10/2016 | Main | H04W 12/37 |
| 2017/0149931 | A1 * | 5/2017 | Lochhead | H04L 41/40 |
| 2017/0329957 | A1 * | 11/2017 | Vepa | G06F 21/445 |
| 2018/0157532 | A1 * | 6/2018 | Kumar | G06F 9/4881 |
| 2021/0390170 | A1 * | 12/2021 | Olden | H04L 63/08 |

FOREIGN PATENT DOCUMENTS

| | | |
|---|---|---|
| WO | 2015021547 | 2/2015 |
| WO | 2015074150 | 5/2015 |

* cited by examiner

COMPUTER-IMPLEMENTED IDENTITY AND ACCESS MANAGEMENT SYSTEM, METHOD, COMPUTER PROGRAM AND RECORDING MEDIUM

CROSS-REFERENCE TO RELATED APPLICATIONS

This is a U.S. national stage of application No. PCT/EP2024/055080 filed 28 Feb. 2014. Priority is claimed on European Application No. 23160996.7 filed 9 Mar. 2023, the content of which is incorporated herein by reference in its entirety.

BACKGROUND OF THE INVENTION

1. Field of the Invention

The present disclosure relates to a computer-implemented identity and access management system, a computer-implemented method for creating an identity and access management system, a computer program and a computer-readable recording medium.

In particular, the invention generally relates to the field of identity and access management (IAM) systems and, more particularly, relates to a multi-domain extension system for identity and access management that enables original equipment manufacturers (OEMs) to retain control over certain aspects of machines or systems after delivery, while enabling their end customers to manage access to their machines or systems in a manner necessary for their operation within their organization.

2. Description of the Related Art

An OEM designs and produces machines or systems with the aim of delivering them to its end customers or end users. The end customers or end users in turn operate these machines to control their industrial processes.

When preparing these machines and systems, the OEM programs them and equips them with functions and data. For example, a CNC drilling machine can have a function for the maximum safe speed defined by data representing the maximum rotational speed of the drill chuck shaft. After delivery is complete, the OEM must still have access to the machines/systems that are no longer in its possession, at least for maintenance and/or service purposes. In this situation, access to the machine or the system is typically regulated by assigning roles or specific rights to identities (e.g., people, employees, or users). This step of preparing access to the machine or the system is preferably performed before delivery of the machine and system to the end customer.

The use of IAM systems supports the user in this task of access management and hence ensures that only configured access is permitted and carried out.

While the OEM retains control of certain parameters, data and/or functions (i.e., denies the end customer or user access to them) and wants to be able to access them at any time, end customers or users want to be able to manage access to their machines and systems themselves, as required for their operations and the functioning of their organization. In addition, end customers or users frequently also have their own identity and access solutions that they want to use on the machines and systems they have acquired, and this conflicts with the OEM's solution.

This problem is further exacerbated by the fact that many end customers introduce or have introduced solutions for managing access to their various machines and systems that are intended to enable access to continue to be configured on a machine-specific basis. For example, end customer employee A may have access to machine 1, while end customer employee B (who has the same roles and rights as employee A) only has access to machine 2, but not to machine 1. There is therefore a need for end customers to have the ability to manage the access configuration for these specific functions at a different level of granularity.

In modern industrial systems, it is also becoming increasingly common to integrate access protection into the central systems of the companies. In this context, however, end customers and OEMs have different needs. For example, end customers want to be able to identify, control and authenticate the use of the company's machines and systems in detail (i.e., down to machine-by-machine granularity) to manage this access with their own existing means. On the other hand, the OEM's needs are different because it is not desirable for the OEM to have to worry about the passwords stored in each machine or segregating access from machine to machine. Rather, it is preferable for its employees to be able to access the delivered machines and systems for the limited needs of maintenance and after-sales service, e.g., using ID cards.

Herein, it should be noted that the relationship between the end customer and the OEM can be even more complex, because the OEM which, for example, supplied the machine or the system may possibly have used subassemblies or parts supplied by other OEMs, where these OEMs also want to ensure access to their parts or subassemblies in the same way as the first OEM.

Finally, in some applications, the end customers may want to control when they grant the OEM access to the machines or systems it uses, e.g., only for on-site or remote service purposes at an agreed time that is convenient for operation, i.e., for example, in a way that does not interfere with the end customer's operational schedule.

A conventional solution provides for setting up two separate access systems: one for the OEM and one for the end customer (which can be optional). In this known approach, the granularity of the roles and rights system is less pronounced on the OEM side than it is on the end customer side. It is more a question of whether the functions of the OEM are activated when access is permitted or not. This allows the OEM to choose its own security solution, e.g., by using a password, access card, special key or the like. This enables the OEM's employees to unblock the machines with their respective password, access card or special key and thus gain access to the respective machines.

On the end customer side, the machine can be used freely or the end customer can set up secure access, e.g., with one or more passwords. Alternatively, the OEM can also enable integration into the end customer's identity management solution, e.g., through Microsoft Active Directory, LDAP, OpenID Connect (OIDC), etc. In this way, machine-specific access can be set up by ensuring that the end customer employees know the passwords required for a corresponding machine or, in the case of a central identity management system, by only registering on the machine the employees that can access the machine.

U.S. Publication No. 2021/0390170 A1—Olden et al. "SYSTEMS, METHODS, AND STORAGE MEDIA FOR MIGRATING IDENTITY INFORMATION ACROSS IDENTITY DOMAINS IN AN IDENTITY INFRASTRUCTURE" provides that, in a system environment with a plurality of domains, a user along with their user-related rights is migrated from a first domain to a second domain and is then able to exercise the same rights in the second domain as in the first domain.

SUMMARY OF THE INVENTION

It is an object of the present invention to provide improved multi-domain access and identity management that particularly enables OEMs to retain control over certain aspects of their machine or system, while end customers can manage access to the machine that is necessary for operation within their organizations.

This and other objects and advantages are achieved in accordance with the invention by a computer-implemented identity and access management system, a method for creating and using such a system, a computer program and a recording medium with computer instructions.

The invention is based on an identity management system consisting of at least two identity management subsystems (or "domains"), i.e., one subsystem or domain for the OEM and one for the end customer. Each domain is created and managed by the administrator of the corresponding organization. Nevertheless, in a time sequence, the OEM first creates its domain, initializes it and delivers it to the end customer as part of the machine or system. The end customer in turn then creates its domain and links it to the OEM's domain. In other words, the end customer's subsystem/domain is an extension of the original system that initially consists only of the OEM's subsystem/domain.

End customers can therefore configure specific access to their machines/systems, e.g., employee A has access to machine 1, while employee B with the same roles/rights nevertheless has access to machine 2. This configuration is the responsibility of the end customer and does not require any additional work on the part of the OEM.

In fact, the invention enables specific access to the machine according to the needs of the end customer, while it allows the OEM access via the ID cards of its employees, i.e., with a different level of granularity.

In summary, an expandable system is provided in which additional OEMs or end customers can be added to the system. In addition, a system of fine-grained roles/rights for the OEM and end customer areas is provided which allows flexible configuration of access.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWING

The present invention is explained in more detail below with reference to the exemplary embodiments shown in the schematic figures in the drawings, in which.

DETAILED DESCRIPTION OF THE EXEMPLARY EMBODIMENTS

Figure 1:
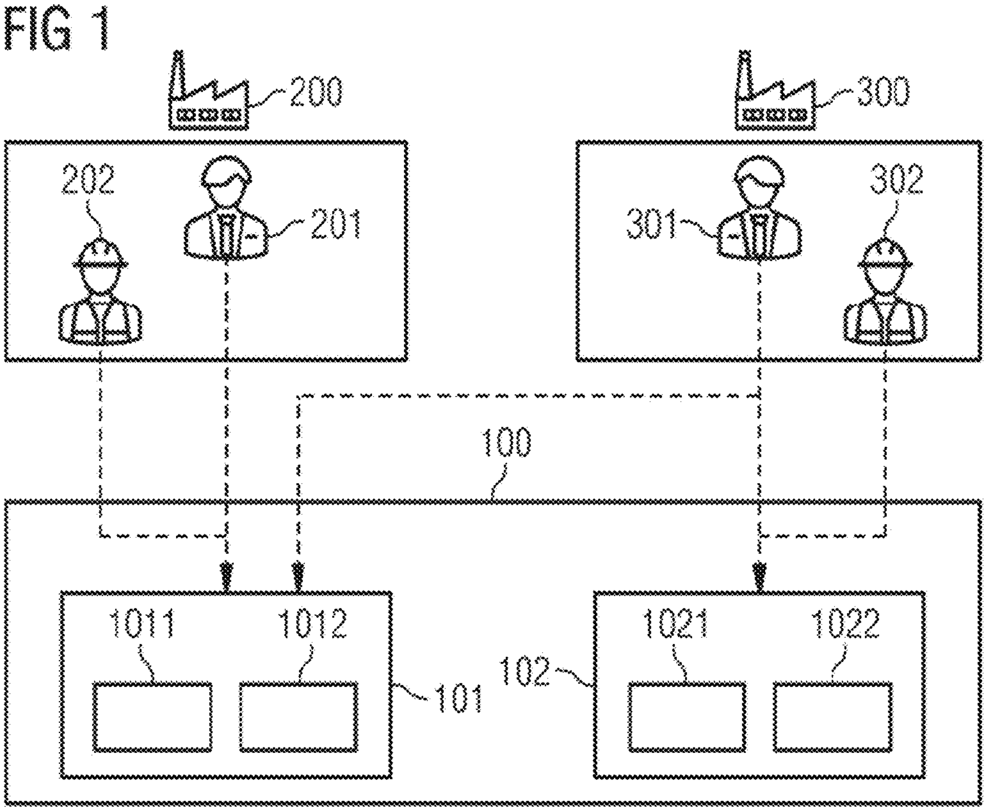
FIG. 1 an abstract representation of the multi-domain IAM extension system for managing access and identities.

The accompanying drawings are intended to provide a further understanding of the embodiments of the invention. They illustrate embodiments and, in conjunction with the description, serve to explain principles and concepts of the invention. Other embodiments and many of the noted advantages will become apparent from the drawings. The elements of the drawings are not necessarily shown true to scale.

Unless otherwise stated, in the figures in the drawing, the same, functionally identical and functionally equivalent elements, features and components are each provided with the same reference symbols.

In the following, the embodiments will now be described in detail with reference to the accompanying drawings. However, the disclosure is not limited to the embodiments in which the idea of the disclosure is presented. Another embodiment that is within the scope of the idea of another earlier disclosure or the earlier disclosure can easily be proposed by adding, changing, removing, etc., another element.

The terms used in this specification have been chosen to encompass common and widely used general terms. In some cases, a term may be a term arbitrarily defined by the applicant. In such cases, the meaning of the term is defined in the relevant part of the detailed description. Thus, the terms used in the specification should not be defined simply by the name of the terms, but based on the meaning of the terms and the general description in this disclosure.

The present invention relates to a multi-domain IAM extension system for managing access and identities for industrial machines and systems that enables the OEMs that manufactured these machines and systems to retain sole control over some of their functions and data, while end users can manage access required for operation within their organization.

As shown in FIG. 1, the multi-domain IAM extension system 100 comprises at least two identity management systems or domains, one domain 101 for the OEM 200 and one domain 102 for the end customer 300. Each domain is created and managed by the administrator of the corresponding organization. In other words, the OEM administrator 201 creates and manages the domain 101 of the OEM, while the end customer administrator 301 creates and manages the domain 102 of the end customer.

Each domain of the multi-domain IAM extension system comprises submodules in which functions and data are stored. Specifically, the OEM domain 101 comprises a module 1011 for storing functions and a module 1012 for storing data. Thus, using the above example, the module 1011 for storing functions can contain the function of the maximum safe speed for a CNC drilling machine, while the data module 1012 of the OEM domain can contain the corresponding value of this maximum safe speed. The functions and data present in the OEM domain 101 should not be known, accessible or modifiable by anybody in the organization of the end customer 300. In other words, the multi-domain IAM extension system 100 is configured such that only an OEM administrator 201 or an OEM employee 202 can access the OEM domain 101. Nevertheless, in a particular embodiment of the present invention, the multi-domain IAM extension system 100 is configured to provide special access to the administrator 301 of the end customer 300. This special access is limited to the ability to block or allow access by someone belonging to the OEM organization to the OEM domain 101 of the system 100. This function is intended to allow the end customer 300 to limit the operations that can be performed by the OEM on the machines/systems at times when interruptions to use are undesirable, while at the same time ensuring that the same end customer administrator 301 cannot, under any circumstances, interfere with the functions or data of the OEM domain. Hence, the OEM domain 101 remains a domain reserved for the OEM.

In chronological sequence, the OEM domain 101 is initially created in the form of a base domain of the IAM system 100, since this domain is prepared and implemented before the machine or system is delivered to the end customer 300. Thus, the domain 102 of the end customer is subsequently created in the form of an extension domain of the IAM system 100, which is added as an additional domain of the system 100 to which the end customer 300 has access. In a preferred embodiment, only an administrator 301 of the end customer 300 or an employee 302 of the end customer 300 has access to the end customer domain 102.

Similarly to the domain 101 of the OEM, the domain 102 of the end customer 300 comprises a module 1021 for storing end customer functions and a module 1022 for storing end customer data. The IAM system 100 and the end customer domain 102 of the end customer 300 are configured such that only people belonging to the organization of the end customer 300 have access to the end customer domain 102 of the end customer 300.

It should be noted that, in preferred embodiments, the administrators 201 of the OEM 200 and the administrators 301 of the end customer 300 are those people in their respective organizations who are responsible for the definition of the roles, functions and access privileges of the employees of their respective organizations.

It bears noting that the multi-domain IAM extension system 100 for access and identity management can be installed in different ways.

One approach may be to install this IAM system 100 directly locally on the delivered machine or the delivered industrial system, i.e., in a computer system of this machine or this system comprising at least one memory for storing the domains and their modules. Nevertheless, there are also other embodiments that do not cast doubt on the functionality of the present invention. In fact, the system 100 can certainly be installed in a centralized system of the end customer 300 or even be hosted in a centralized system of the OEM 200. Distributed implementation of the system 100 between the computer systems of the OEM and the end customer 300 is quite conceivable. Likewise, the system can be implemented in a cloud outside the computer systems of the OEM 200 and the end customer 300.

Figure 2:
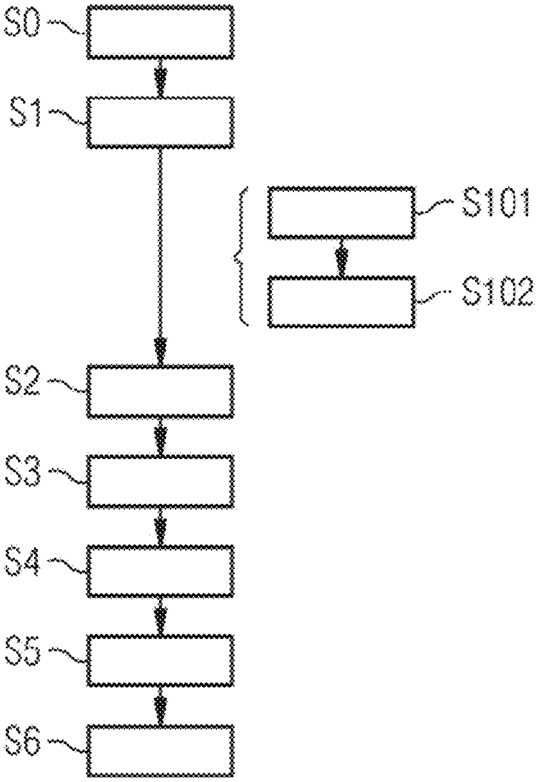
FIG. 2 a representation of the steps of a computer-implemented method that enables the creation and use of the multi-domain IAM extension system for access and identity management.

FIG. 2 shows the steps of a computer-implemented method that enables the creation and use of the multi-domain IAM extension system 100 for access and identity management.

In step S0, the OEM creates the system 100. This can take one of the forms discussed above, e.g., it can be installed on the memory of a machine. Here, the machine will have a communication module that allows it to communicate with the systems of the OEM and an end customer.

In step S1, the OEM creates its domain 101 within the system 100 or base domain, initializes it and configures the content of the functional storage module 1011 and the data storage module 1012. During this creation, the access rights of the domain 101 of the OEM 200 are configured (e.g., by the administrator 201) in order to prevent people who are not part of the organization of the OEM accessing the content of the modules 1011 and 1012 of the domain 101 of the OEM 200. Likewise, these access rights can only be reconfigured by the OEM 300.

Optionally, the OEM can create and initialize the end customer domain 102 in the system 100 in a substep S101. However, this step can also be performed later on in the process, e.g., by the end customer when the machines and systems come into their possession.

In the event that substep S101 has been performed, a further optional substep S102 can be performed in which the OEM can preconfigure the domain 102 of the end user 300 by configuring the content of the functional storage module 1021 and the data storage module 1022 of the end customer domain.

In step S2, the end customer 300 can create and initialize the end customer domain 102 or extension domain if the optional substep S101 has not been performed.

Likewise, the end customer 300 can configure the domain 102 of the end user 300 by configuring the content of the functional storage module 1021 and the data storage module 1022 of the domain of the end customer if the optional substep S102 has not been performed.

In the optional step S3, the end customer 300 can access its domain 102 and make new bookings in the function and data storage modules 1021 and 1022 of its domain 102.

In the optional step S4, the end customer 300 can block the access of the OEM to its domain 101. In this way, the end customer can prevent unwanted interventions in machines or systems.

In the optional step S5, the end customer 300 can unblock the OEM's access to its domain 101.

In the optional step S6, the OEM 200 can access its domain 101 and perform new write operations in the function and data storage modules 1021 and 1022 of its domain 101.

The multi-domain-extension IAM 100 allows the OEM to keep certain settings, data and functions under its access control at all times. End customers can configure access on a machine-specific basis allowing them to assign specific roles or rights to identities such as people, employees and users.

The following describes embodiments of the present disclosure in detail with reference to the accompanying drawings. It should be noted that the same reference symbols are used in the drawings to designate identical or similar elements.

In summary, the disclosed embodiments of the multi-domain IAM extension system offer several technical advantages compared to the prior art. First, the OEM and the end customer are allowed to manage access to the machine or the system securely and efficiently without intervening in the identity and access management of the respective other party. This is achieved by creating at least two separate identity management subsystems (or domains) that are managed by the administrator of the respective organization.

Secondly, the disclosed embodiments of the invention represent a fine-grained role and right system for both the OEM and the end customer, allowing them to easily manage access to specific functions and data. This increases the security of the machine or system and ensures that only authorized employees of the respective organization have access to sensitive information or functions.

Thirdly, the disclosed embodiments of the invention enable the integration of the access protection for the machine or system into end customer central systems, thus simplifying the management of access across multiple machines or systems. This eliminates the need to manage individual passwords for each machine or system and increases overall security by ensuring that all access is managed centrally.

In addition, the disclosed embodiments of the invention allow the OEM to control access to its protected data and functions at all times, while the end customer can manage access to the machine or the system required for the operation within its organization. In addition, the end customer can configure access on a machine-specific basis thus allowing different employees to have different roles and rights on different machines or systems.

Finally, the disclosed embodiments of the invention also have the advantage that the end customer can block or release the OEM's access. This ensures, in a remote intervention/remote service environment, that the OEM cannot intervene in a way that would harm the production process implemented by the customer. This significantly improves availability and security on the end customer side.

Overall, the disclosed embodiments of the multi-domain IAM extension system represent a significant improvement over existing solutions, because it provides a secure and efficient way to manage access to machines or systems with fine-grained control of roles and rights, centralized access management and the ability to protect data and OEM functions.

Although the present disclosure was described above by preferred embodiments, it is not limited thereto, but rather may be modified in many ways.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps that perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A computer-implemented identity and access management system comprising:

at least one processor; and memory;

at least two domains which are each assigned to a user organization;

wherein a first domain of the at least two domains comprises an original equipment manufacturer (OEM) domain associated with users of an OEM organization;

wherein a second domain of the at least two domains comprises an end customer domain associated with users of an end customer organization;

wherein each domain comprises a module for storing functions and a module for storing data corresponding to the functions;

wherein the module for storing functions and the module for storing data of the OEM domain are configured to only grant access to a user of the OEM organization;

wherein the system is configured to grant a user of the end customer organization restricted access to the OEM domain to allow the user to block or release access of users of the OEM to the module for storing functions and the module for storing data of the OEM domain;

wherein the module for storing functions and the module for storing data are implemented via the memory; and wherein the module for storing functions is configured to authenticate the user via a cryptographic credential prior to granting access to the module for storing data.

2. The system as claimed in claim 1, wherein the modules of the OEM domain are configured such that access rights can only be configured by an administrator of the OEM organization.

3. The system as claimed in claim 1, wherein each domain is installed locally on a computer system of a machine.

4. The system as claimed in claim 2, wherein each domain is installed locally on a computer system of a machine.

5. The system as claimed in claim 1, wherein each domain is installed on a central computer system.

6. The system as claimed in claim 2, wherein each domain is installed on a central computer system.

7. The method as claimed in claim 2, further comprising:

blocking access by users of the OEM to the domain of the OEM by the end customer.

8. A computer-implemented method implemented utilizing at least one processor and memory for creating an identity and access management system including at least two domains which are each assigned to a user organization, a first domain being an original equipment manufacturer (OEM) domain assigned to users of an OEM organization, and a second domain being an end customer domain assigned to users of an end customer organization, the method comprising:

creating, by an OEM, the identity and access management system;

creating, by the OEM, the OEM domain and initializing and configuring a module for storing functions and a module for storing data in the OEM domain, wherein the module for storing functions and the module for storing data of the OEM domain being configured to each only allow access to a user of the organization of the OEM; and creating (S2), by one of the OEM and the end customer, the end customer domain in the system;

wherein granting a user of the end customer organization restricted access to the OEM domain allows the user to block or release access of users of the OEM to the module for storing functions and the module for storing data of the OEM domain;

wherein the module for storing functions and the module for storing data are implemented via the memory; and wherein configuring the module for storing functions comprises authenticating the user via a cryptographic credential prior to granting access to the module for storing data.

9. The method as claimed in claim 8, further comprising:

configuring, by an administrator of the OEM, access rights to the OEM domain.

10. The method as claimed in claim 9, wherein said configuring access comprises:

configuring, by an administrator of the end customer, access rights to the domain of the end customer.

11. The method as claimed in claim 8, further comprising:

initializing and configuring, by the OEM, a module for storing functions and a module for storing data in the end customer domain, or initializing and configuring, by the end customer, a module for storing functions and a module for storing data in the end customer domain.

12. The method as claimed in claim 11, further comprising:

accessing, by the end customer, the end customer domain and performing write operations in the module for storing functions and the module for storing data of the end customer domain.

13. The method as claimed in claim 8, further comprising:

unblocking, by the end customer, access by an OEM entity to the domain of the OEM.

14. The method as claimed in claim 8, further comprising:

accessing the OEM domain via the OEM and performing write operations in the module for storing functions and the module of the OEM domain.

15. A non-transitory computer-readable recording medium encoded with instructions for creating an identity and access management system including at least two domains which are each assigned to a user organization which, when executed by a processor of a computer, cause the computer to execute the steps of the method as claimed in claim 8.

* * * * *